United States Patent
Soffer et al.

(10) Patent No.: US 9,547,482 B2
(45) Date of Patent: Jan. 17, 2017

(54) DECLARATIVE DESIGN-TIME EXPERIENCE PLATFORM FOR CODE GENERATION

(71) Applicant: SAP Portals Israel Ltd, Ra'anana (IL)

(72) Inventors: Guy Soffer, Ra'anana (IL); Guy Blank, Tel Aviv (IL); Maxim Drabkin, Haifa (IL)

(73) Assignee: SAP Portals Israel Ltd., Ra'anana (IL)

( * ) Notice: Subject to any disclaimer, the term of this patent is extended or adjusted under 35 U.S.C. 154(b) by 0 days.

(21) Appl. No.: 14/810,682

(22) Filed: Jul. 28, 2015

(65) Prior Publication Data
US 2016/0357526 A1 Dec. 8, 2016

Related U.S. Application Data

(60) Provisional application No. 62/169,741, filed on Jun. 2, 2015.

(51) Int. Cl.
G06F 9/44 (2006.01)
G06F 9/45 (2006.01)

(52) U.S. Cl.
CPC . *G06F 8/38* (2013.01); *G06F 8/36* (2013.01); *G06F 8/20* (2013.01); *G06F 8/70* (2013.01)

(58) Field of Classification Search
CPC .............................................. G06F 8/20–8/70
See application file for complete search history.

(56) References Cited

U.S. PATENT DOCUMENTS

| | | | |
|---|---|---|---|
| 8,423,895 B2 | 4/2013 | Friedman et al. | |
| 9,026,647 B2 | 5/2015 | Soffer et al. | |
| 9,036,648 B2 | 5/2015 | Kubovsky et al. | |
| 2004/0153992 A1* | 8/2004 | Molina-Moreno | G06F 8/35 717/105 |

(Continued)

OTHER PUBLICATIONS

Patricia Miravet, A Framework for the Declarative Implementation of Native Mobile Applications, 2013, pp. 1-26.*

(Continued)

*Primary Examiner* — Thuy Dao
*Assistant Examiner* — Mongbao Nguyen
(74) *Attorney, Agent, or Firm* — Fish & Richardson P.C.

(57) ABSTRACT

The disclosure generally describes methods, software, and systems, including a method for using templates to generate application code. A selection of a template is received from an application development user interface. The template includes a declarative model file describing user interface aspects for declaring customization of applications in an implementation-independent, consistent way, independent of the selected template and a target computer. A metadata file includes information describing the template. Plural template files provide specific syntax suitable for code generation. The template is provided in the user interface using at least development environment plugins. Customization inputs associated with the template are received from the user interface. The customization inputs provide parameters used in the code-generation plugins. Application code is automatically generated for a target computer based on the selected template and the received customization inputs. The generated application code includes at least the code generated from the code-generation plugins.

20 Claims, 4 Drawing Sheets

(56) References Cited

U.S. PATENT DOCUMENTS

| | | | | |
|---|---|---|---|---|
| 2006/0168557 A1* | 7/2006 | Agrawal | ............... | G06F 8/20 |
| | | | | 717/104 |
| 2007/0168934 A1* | 7/2007 | Chandrasekharan | ..... | G06F 8/36 |
| | | | | 717/106 |
| 2007/0288891 A1* | 12/2007 | Aakolk | ............... | G06Q 10/10 |
| | | | | 717/114 |
| 2008/0046868 A1* | 2/2008 | Tsantilis | ............... | G06F 8/36 |
| | | | | 717/136 |
| 2008/0127053 A1* | 5/2008 | Stubbs | ............... | G06F 8/38 |
| | | | | 717/106 |
| 2008/0163162 A1* | 7/2008 | Shaburov | ............... | G06F 8/34 |
| | | | | 717/105 |
| 2008/0256509 A1* | 10/2008 | Mazzeranghi | ........... | G06F 8/36 |
| | | | | 717/106 |
| 2008/0263509 A1 | 10/2008 | Brutman et al. | | |
| 2008/0301626 A1* | 12/2008 | Sivaram | ............... | G06F 8/10 |
| | | | | 717/104 |
| 2009/0019420 A1* | 1/2009 | Johnson | ............... | G06F 8/36 |
| | | | | 717/101 |
| 2009/0228866 A1* | 9/2009 | Lochmann | ............... | G06F 8/74 |
| | | | | 717/107 |
| 2010/0058170 A1* | 3/2010 | Demant | ............... | G06Q 10/10 |
| | | | | 715/234 |
| 2010/0262902 A1* | 10/2010 | Burns | ............... | G06F 8/38 |
| | | | | 715/234 |
| 2010/0287528 A1* | 11/2010 | Lochmann | ............... | G06F 8/24 |
| | | | | 717/104 |
| 2011/0113436 A1* | 5/2011 | Pal | ............... | G06F 11/2094 |
| | | | | 719/328 |
| 2012/0324077 A1* | 12/2012 | Roy | ............... | G06F 1/3203 |
| | | | | 709/223 |
| 2013/0191810 A1* | 7/2013 | Brandstetter | ............ | G06F 8/34 |
| | | | | 717/109 |
| 2014/0059516 A1* | 2/2014 | Ferber | ............... | G06F 8/38 |
| | | | | 717/105 |
| 2014/0173563 A1* | 6/2014 | Dias | ............... | G06F 8/74 |
| | | | | 717/123 |
| 2014/0237443 A1* | 8/2014 | Pana | ............... | G06F 8/38 |
| | | | | 717/105 |
| 2014/0289738 A1* | 9/2014 | Paliwal | ............... | G06F 8/38 |
| | | | | 719/311 |
| 2014/0343981 A1 | 11/2014 | Blank et al. | | |
| 2015/0135163 A1* | 5/2015 | Mun | ............... | G06F 8/71 |
| | | | | 717/120 |
| 2015/0186132 A1* | 7/2015 | Oliveri | ............... | G06F 8/34 |
| | | | | 717/120 |
| 2016/0041815 A1* | 2/2016 | Bhagat | ............... | G06F 17/30424 |
| | | | | 717/107 |

OTHER PUBLICATIONS

Christian Buckl, Models for automatic generation of safety-critical real-time systems, 2007, pp. 1-8.*

Oracle, Maximizing Development Productivity with Oracle Data Integrator 11g, 2010, pp. 1-22.*

* cited by examiner

DECLARATIVE DESIGN-TIME EXPERIENCE PLATFORM FOR CODE GENERATION

CLAIM OF PRIORITY

This application claims priority under 35 USC §119(e) to U.S. Patent Application Ser. No. 62/169,741, filed on Jun. 2, 2015, the entire contents of which are hereby incorporated by reference.

BACKGROUND

The present disclosure relates to the generation of code.

Application code developers can use manual and/or automatic ways to develop new application code. Automatic ways of developing application code can include, for example, the user of interactive development environments (IDEs) that provide a user interface for aiding in the code-generation process. Different IDEs exist, e.g., that are offered by different vendors.

SUMMARY

The disclosure generally describes computer-implemented methods, software, and systems for using templates to generate application code. For example, a selection of a template from plural templates is received from an application development user interface. The template includes a declarative model file describing user interface aspects for declaring customization of applications in an implementation-independent, consistent way, independent of the selected template and a target computer for generated code. The template also includes a metadata file including information describing the template and one or more template files providing specific syntax suitable for code generation. The template is provided in the application development user interface. Customization inputs associated with the template are received from the application development user interface. The customization inputs provide parameters used in the code-generation plugins. Application code is automatically generated for the target computer based on the selected template and the received customization inputs. The generated application code includes at least the code generated from the code-generation plugins.

The present disclosure relates to computer-implemented methods, software, and systems for generating executable components. One computer-implemented method includes: receiving, from an application development user interface, a selection of a template from plural templates, the template including a declarative model file describing user interface aspects for declaring customization of applications in an implementation-independent, consistent way, independent of the selected template and a target computer for generated code, a metadata file including information describing the template, and one or more template files providing specific syntax suitable for code generation; providing the template in the application development user interface; receiving, from the application development user interface, customization inputs associated with the template, the customization inputs providing parameters used in the code-generation plugins; and automatically generating application code for the target computer based on the selected template and the received customization inputs, the generated application code including at least the code generated from the code-generation plugins.

The foregoing and other implementations can each optionally include one or more of the following features, alone or in combination. In particular, one implementation can include all the following features:

In a first aspect, combinable with any of the previous aspects, the template is consistent in use with other templates of the plural templates and provides a consistent coding experience for the user.

In a second aspect, combinable with any of the previous aspects, the template further includes custom code hooks for user customization of the template, including containers for holding custom code provided by the user and triggers for executing the custom code when the application code is executed according to timing specified by the hooks.

In a third aspect, combinable with any of the previous aspects, the application development user interface includes code-generation plugins and development environment plugins.

In a fourth aspect, combinable with any of the previous aspects, the metadata further includes a template ID, a template name, a version, a description of what the template provides, and a category associated with the template.

In a fifth aspect, combinable with any of the previous aspects, the declarative model file includes definitions for field types selected from a group comprising a text box, a combo box, a drop-down, a check box, and a radio button.

In a sixth aspect, combinable with any of the previous aspects, the method further comprises receiving, from a template development user interface, template information associated with the plural templates and storing the template information for use by the application development user interface.

In a seventh aspect, combinable with any of the previous aspects, fields in the template are mandatory or required.

In an eighth aspect, combinable with any of the previous aspects, fields in the template have default values.

The subject matter described in this specification can be implemented in particular implementations so as to realize one or more of the following advantages. Users are provided with a standard, consistent interface across development environments instead of a collection of interfaces, each interface providing a different user experience. There is no need to develop separate user interfaces for each of the different templates and development environments. Template developers can rapidly develop several templates, e.g., using declarative techniques, as UIs for each template do not need to be developed. Users can be provided with a declarative way of providing a design-time experience when using code-generation templates in any development environment, including the use of templates developed by a template developer.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
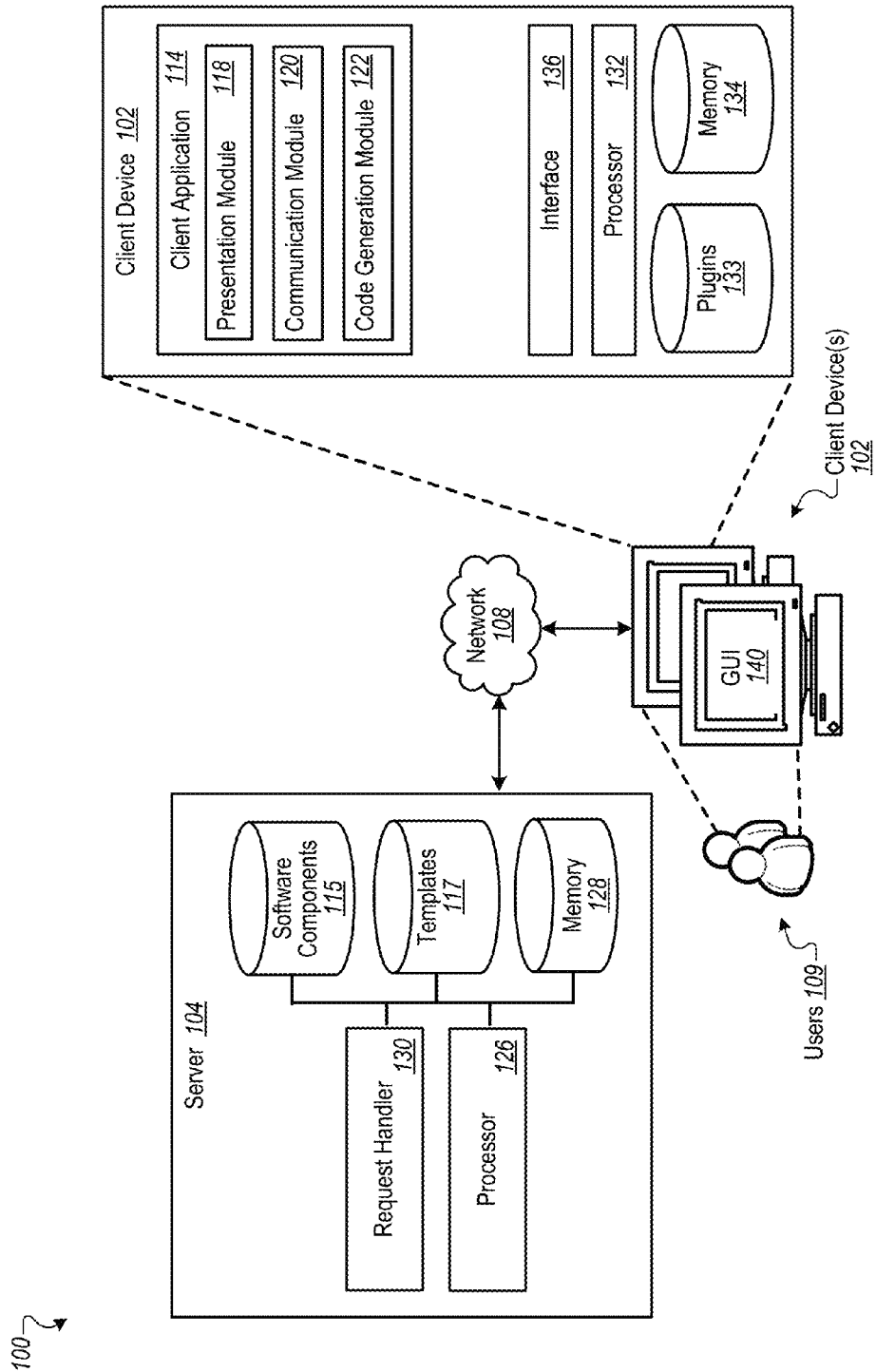
FIG. 1 is a block diagram of an example environment for using templates to generate application code.

This disclosure generally describes computer-implemented methods, software, and systems for using templates to generate application code. For example, code generation done by an application developer can be based on templates. In some implementations, applications that use the templates can be integrated into development environments and can use a code generation engine. Each template can be defined by or encapsulated in, for example, a template package that describes the template's own, specific user interface, but that is similar to user interfaces of other templates used in the same framework. One benefit of this approach is that a template developer, when providing a template package, does not need to provide a user interface and logic code for obtaining inputs from the user during template use. This can be achieved, for example, through the use of a template model and template metadata files that are defined in the template package. A template developer, for example, can provide the same template package for any development environment (e.g., Eclipse, Visual Studio, SAP Web IDE). The same template package can be used in whatever development environment is being used, e.g., without requiring that proprietary code be written.

Typical template-based code-generation frameworks can usually include a proprietary template language syntax, a proprietary generator engine, and input data for code generation. To enable code generation for developers in these frameworks, some level of development effort is required for each specific template and its hosting environment (e.g., Eclipse, Visual Studio etc.). For example, the development effort can include integration into a selected code-generation framework, developing a custom user interface (UI) to support end-user input for each template, integration to a code-generation process (e.g., including custom user-input data), and the development of multiple templates. The overhead in such frameworks can be significant because of the need for a developer UI and logic artifacts for each template that is created. Adding support for additional code-generation frameworks can become more complex. Also, processes used in the frameworks can introduce inconsistencies in the design-time experience associated with the different templates.

In some implementations, problems associated with typical frameworks can be solved using a declarative framework, as described herein. For example, the declarative framework can provide a way for defining an input model for a template and describing the template's related design-time experience (e.g., including UI and logic), independent of a hosting environment and the code-generation framework. When needed, the declarative framework can provide hooks for advanced UI and logic implementation. As a result, the declarative framework can eliminate the effort needed in typical frameworks for developing a custom UI and logic for each template. The declarative framework can also provide seamless switching to different code-generation frameworks (e.g., template code can be still written in the respective template language syntax). The declarative framework can also provide a consistent experience for code-generation of any hosting environment or template. Further, the declarative framework can provide a design-time experience framework for templates. For example, the declarative framework can control the UI and logic of a selected template during design-time and can generate the code according to the aggregated end-user input.

In some implementations, in order to integrate templates with the declarative framework, each template can additionally provide a declarative model file and metadata file. These files can be used by the declarative framework to construct the UI and trigger the respective logic and code-generation.

FIG. 1 is a block diagram of an example environment 100 for using templates to generate application code. The illustrated environment 100 includes, or is communicably coupled with, plural client devices 102, and a server 104, all connected using a network 108. For example, the environment 100 can be used to provide access, for users 109 of the plural client devices 102, to resources provided by the server 104. Further, users 109 can use the client device 102 to automatically generate code, based on templates, with parameters customized by the user 109.

Although the architecture of the environment 100 includes the server 104 and plural client devices 102, other implementations can have different architectures. Specifically, the environment 100 does not specifically require a client-server environment. For example, some or all of the components of the server 104 can be located, at least in part, in the plural client devices 102. In some implementations, the environment 100 can include storage of the templates on the client side, and code generation can happen on the client. In some implementations, the environment 100 can facilitate most of the processing on the server side, e.g., storing templates and generating code, and the client side can provide the UI to customize the code generation.

At a high level, the server 104 comprises an electronic computing device operable to store and provide access to resources for use by the client device 102. A library of software components 115, for example, can include plural applications that are stored by the server 104, e.g., populated from code generated at the client device 102. For example, the software components 115 can include code generated automatically at the client device 102 using templates 117 stored at, or available from, the server 104. Software components 115 and templates 117 may be stored or distributed in plural locations, e.g., at the client device 102, at the server 104, and/or other locations.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. Indeed, the server 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 104 may be adapted to execute any operating system, including Linux, UNIX, Windows, Mac OS®, Java™, Android™, iOS or any other suitable operating system. According to some implementations, the server 104 may also include, or be communicably coupled with, an e-mail server, a web server, a caching server, a streaming data server, and/or other suitable server(s). In some implementations, components of the server 104 may be distributed in different locations and coupled using the network 108.

The server 104 further includes a processor 126 and memory 128. Although illustrated as the single processor 126 in FIG. 1, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 126 executes the functionality required to receive and process requests from the client device 102.

The memory 128 or multiple memories 128 may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104. In some implementations, memory 128 includes one or more of the software components 115 (described above). Other components within the memory 128 are possible.

Each client device 102 of the environment 100 may be any computing device operable to connect to, or communicate with, at least the server 104 via the network 108 using a wire-line or wireless connection. In general, the client device 102 comprises an electronic computer device operable to receive, transmit, process, and store any appropriate data associated with the environment 100 of FIG. 1.

A request handler 130, e.g., can handle requests received from the client device 102. Specifically, the request handler 130 can process requests for resources (e.g., templates 117) received from the client application 114 (or its components 118-120). For example, a presentation module 118 can handle user interface aspects of applications that may use resources from the server 104, such as templates 117 for generating code. A communication module 120 can handle communication between the client application 114 and the server 104, for example. The request handler 130 can also receive requests to store code generated at the client device 102, e.g., for storage as software components 115.

The illustrated client device 102 further includes a processor 132, a memory 134, and an interface 136. The interface 136 is used by the client device 102 for communicating with other systems in a distributed environment— including within the environment 100—connected to the network 108, e.g., the server 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

A data store of plugins 133 can include various types of plugins, for example, for generating a user interface (e.g., in the presentation module 118 and integrated with various development environments), and for generating code based on parameter values received from the user 109 to be applied toward template information.

A code generation module 122, included in the client device 102, can generate code, e.g., to be provided for storage as software components 115. The generated code can be based on an instantiated template 117, for example, for which the user has provided values for parameters so as to generate customized code, e.g., using plugins 133, a selected one of the templates 117, and parameter values provided by the user 109.

As illustrated in FIG. 1, the client device 102 includes the processor 132. Although illustrated as the single processor 132 in FIG. 1, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the server 104 and to receive and process responses from the server 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the server 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating user interface screens for using templates and providing parameters for customizing the templates to generate code.

Figure 2:
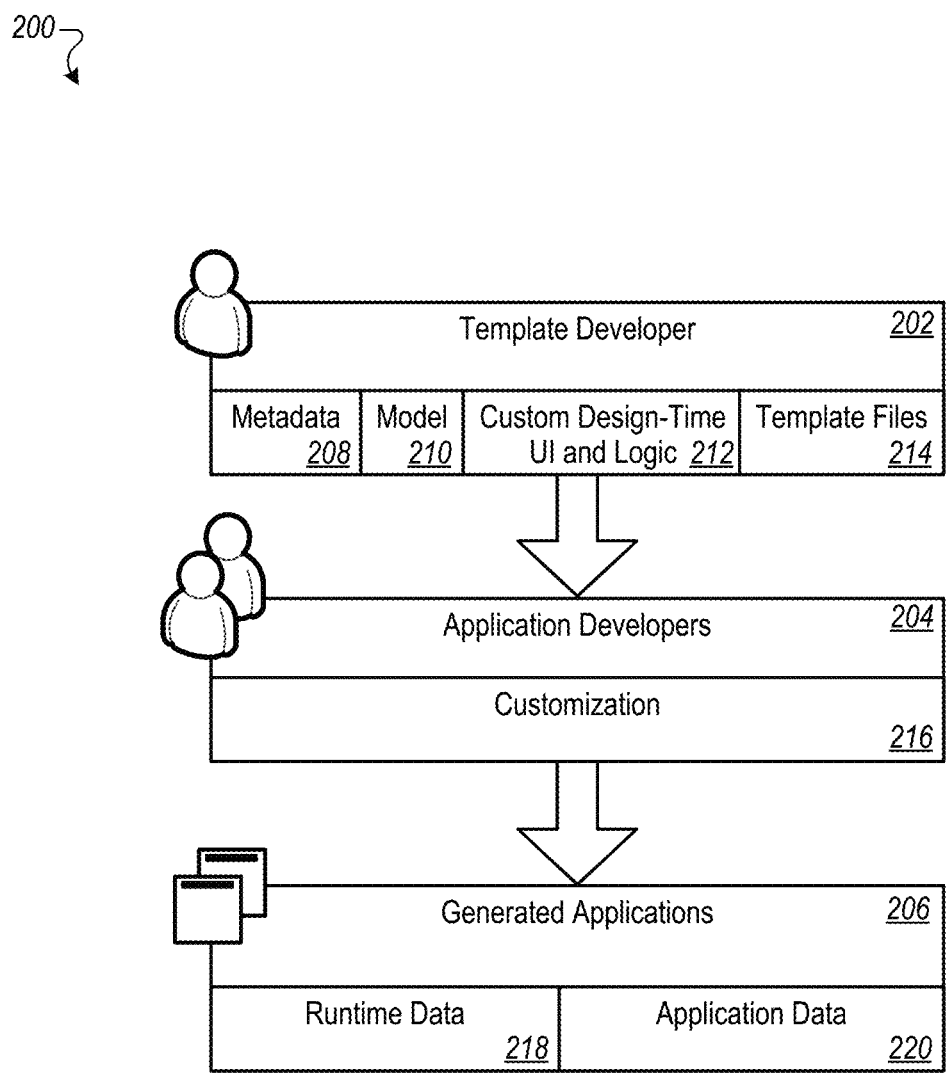
FIG. 2 is a block diagram of an example flow associated with roles and artifacts used in developing and using templates.

FIG. 2 is a block diagram of an example flow 200 associated with roles and artifacts used in developing and using templates. For example, the flow 200 can be used in template-based code generation, including in development environments, such as described above with reference to FIG. 1. The flow 200 identifies two different types of roles: a template developer 202 and application developers 204. The template developer 202 can create templates, e.g., in template projects, for use in a development environment. Application developers 204, for example, can consume (e.g., use) the templates, including specifying parameters for generation of code generation based on a specific template that most closely matches the needs of the application developer. Upon completion of the use of a template, for example, generated applications 206 are created.

The template developer 202, for example, can provide metadata 208, a template model 210, custom design-time user interface (UI) and logic 212, and temporary files 214, each of which are described in detail below with reference to FIG. 3. Application developers 204 can provide customization 216, e.g., including providing values for parameters defined in the template model 210. The generated applications 206 can include, for example, information associated with runtime data 218 (e.g., including data services and sources) and application data 220 (e.g., including the customized code that is to be executed).

Figure 3:
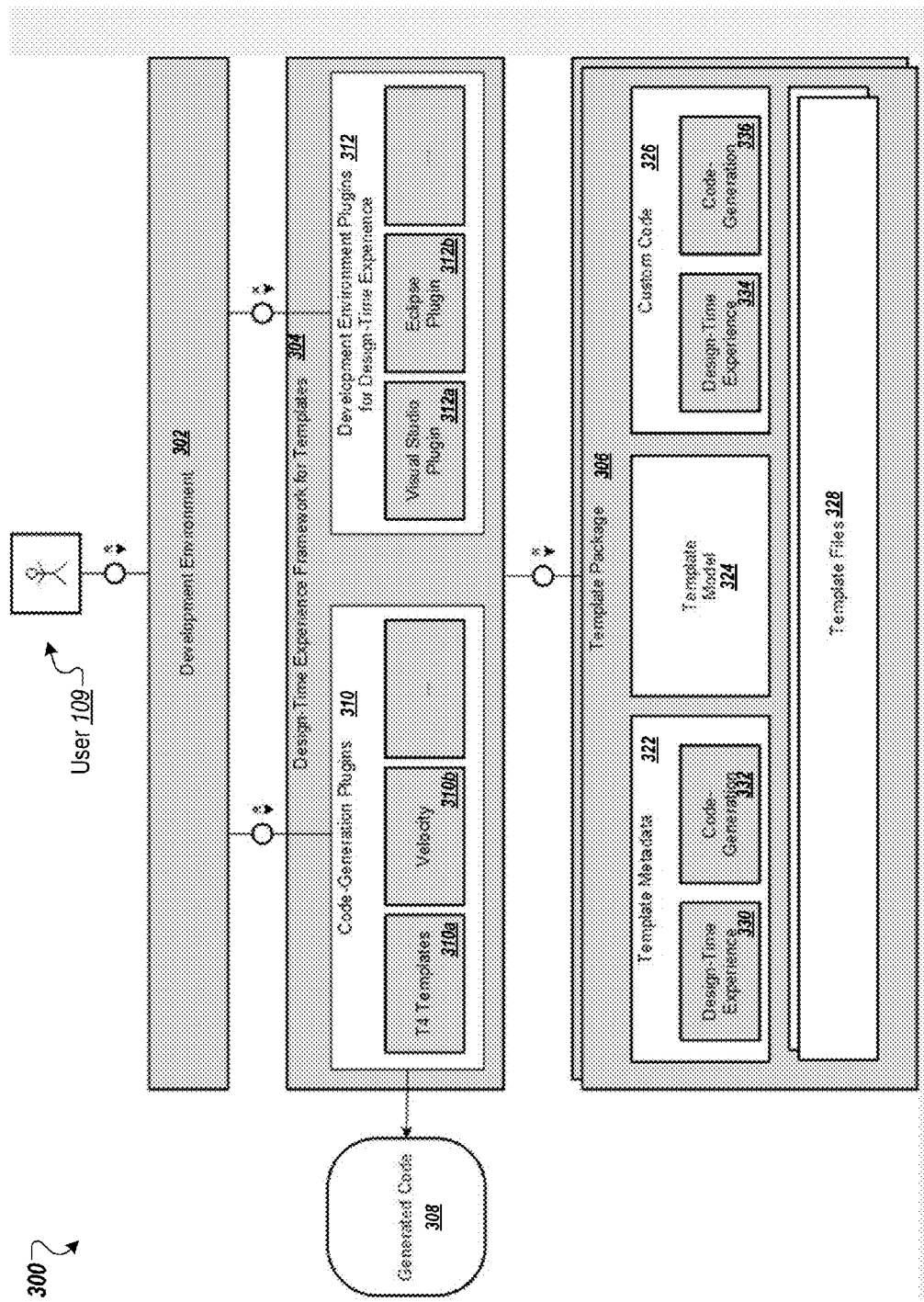
FIG. 3 is a block diagram of an example environment that includes a design-time experience framework.

FIG. 3 is a block diagram of an example environment 300 that includes a design-time experience framework 304 (or "framework" 304). For example, the framework 304 can be used by and correspond to the role of the application developers 204. The environment 300 also includes a development environment 302 and template packages 306 that, together with the framework 304, can be used by the user 109 to produce generated code 308. In some implementations, the framework 304 can be provided, at least in part, by the client application 114 described above. The template packages 306 can be available from templates 117 stored at or by the server 104 (or at the client device 102). The development environment 302 can include interactive development environments (IDEs) (e.g., Eclipse, Visual Studio, SAP Web IDE) and/or other development environment tools.

The framework 304 can include various plugins, such as code-generation plugins 310 and development environment plugins 312 among other components. The code-generation plugins 310, for example, can make the framework 304 independent of a code generation engine, for example. In some implementations, the code-generation plugins 310 can include T4 templates 310a (e.g., including a mixture of text blocks and control logic for generating a text file) and Velocity components 310b (e.g., including tools and building blocks for building web and non-web applications). Other components of the code-generation plugins 310 are possible.

The development environment plugins 312 can include, for example, plugins 312a, 312b, etc., for each of various IDEs for which the framework 304 is to interface. A Visual Studio plugin 312a, for example, can include components for integrating the framework 304 into Visual Studio. An Eclipse plugin 312b, for example, can include components for integrating the framework 304 into Eclipse.

Each template package 306, for example, includes template metadata 322 that is a product of a template developer.

The template metadata 322 includes, for example, a template ID (e.g., numeric ID), a descriptive template name, a version, a description of what the template provides, a category associated with the template (e.g., identifying the flavor or kind of template), and other possible fields/descriptors. The metadata can include files used by the framework 304 to construct user interface triggers and associated logic for code generation. The template metadata 322 includes design-time experience metadata 330, providing a consistent code generation environment, and a code generation metadata 332, e.g., providing consistent code generation across all templates.

A template model 324, can serve as the input model to the framework 304, including identifying the type of data that is needed for specific parameters associated with the template. The template model 324 can serve as a declarative model file describing user interface aspects for declaring customization of applications in an implementation-independent, consistent way, independent of the selected template and a target computer for generated code. For example, the template model 324 can indicate, for the given template package 306, that ten fields are to be completed in some specific way. Example field types that can be defined in the declarative model file include a text box, a combo box, a drop-down, a check box, and a radio button. In some implementations, fields defined in a template can be optional or mandatory, and/or the fields can have default values, e.g., supplied by the template developer or determined in other ways. In some implementations, additional field types and control types can be supported, e.g., including common UI control types that are available across different UI technologies.

Custom code files 326 in the template package 306 can include, for example, hooks for design-time experience 334 (e.g., specified by the user 109 as a change or addition in how the user interface will work in the generated code) and hooks for code generation 336 (e.g., specifying changes in how code is to be generated).

Template files 328 can provide, for example, specific syntax suitable for code generation. For example, the template files 328 can be used at code generation time to apply user-specified parameters to the template to create generated code 308.

In some implementations, the method 400 further includes steps for defining templates to be used by the application developer. For example, template information associated with the plural templates is received from a template development user interface (e.g., based on inputs provided by a template developer). The template information is stored, e.g., in the data store of templates 117, for use by the application development user interface.

Figure 4:
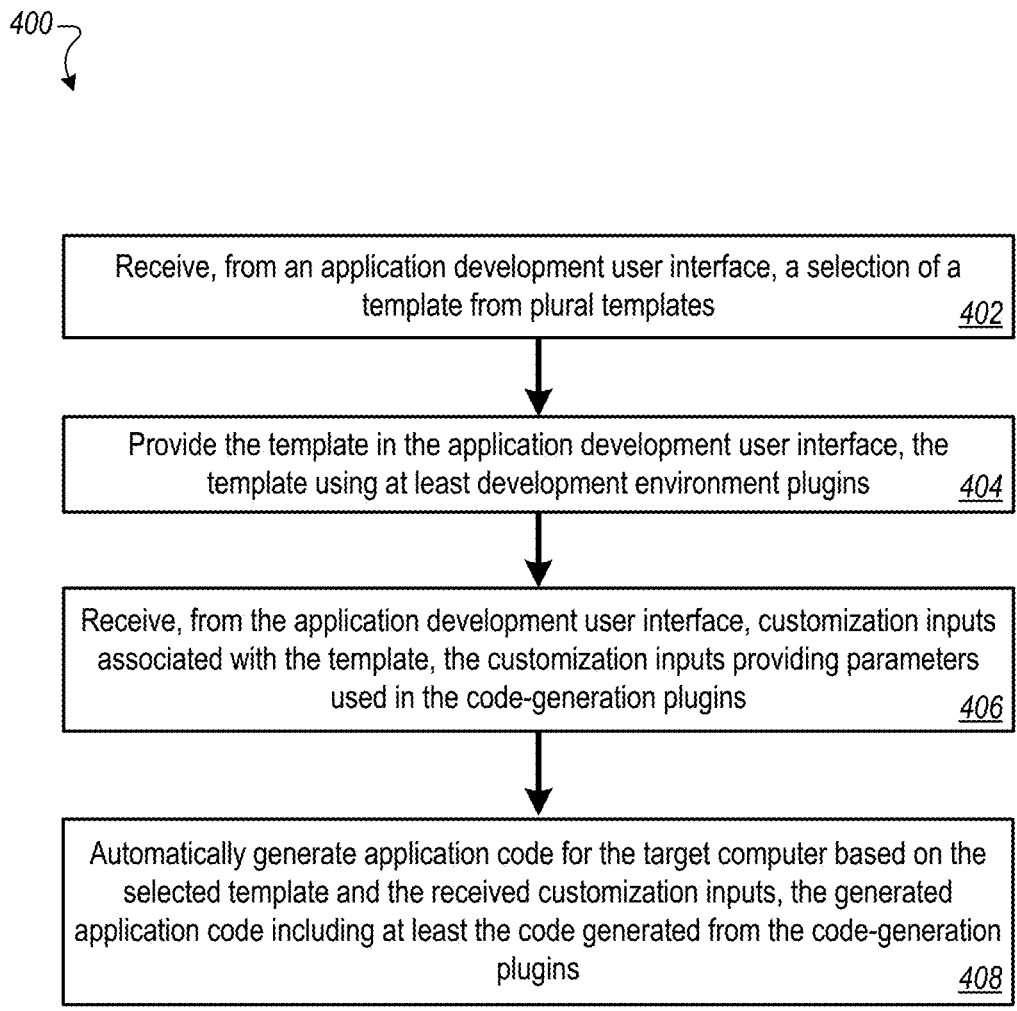
FIG. 4 is a flowchart of an example method for using templates to generate application code.

FIG. 4 is a flowchart of an example method 400 for using templates to generate application code. For clarity of presentation, the description that follows generally describes method 400 in the context of FIGS. 1-3. However, it will be understood that the method 400 may be performed, for example, by any other suitable system, environment, software, and hardware, or a combination of systems, environments, software, and hardware as appropriate. In some implementations, the client device 102 and/or its components can be used to execute the method 400.

At 402, a selection of a template from plural templates is received from an application development user interface. For example, the user 109 (e.g., application developer) can select a template from a list or display of multiple templates on which to base a new application. In some implementations, template selection can be made using the client application 114 running on the client device 102. The template that is selected can be one of the templates 117 provided by the server 104.

In some implementations, the template includes multiple components. For example, a declarative model file can describe user interface aspects for declaring customization of applications in a consistent way, e.g., that are independent of the selected template and a target computer for generated code. A metadata file can include information describing the template. One or more template files can provide specific syntax suitable for code generation.

In some implementations, the template is consistent in use with other templates of the plural templates and provides a consistent coding experience for the user. For example, if the user 109 works with one of the templates, other ones of the templates will operate in the same general way.

In some implementations, the template further includes custom code hooks for user customization of the template, including containers for holding custom code provided by the user and triggers for executing the custom code when the application code is executed according to timing specified by the hooks. For example, the client application 114 can provide hooks for advanced user interface and logic implementation, e.g., not provided by the user-selected template. In this way, the user 109 can experience the consistent interface of the user interface, including the consistent interface provided by generic aspects of the template.

In some implementations, the application development user interface includes code-generation plugins and development environment plugins. For example, the client application 114 can use various plugins 133. Code-generation plugins, for example, can be used to automatically generate code using the template selected by the user. The code-generation plugins can automatically apply the user's inputs, including customization inputs, when generating the code. Development environment plugins, for example, can be used by the presentation module 118 to present information to the user 109 in a consistent way.

At 404, the template is provided in the application development user interface using at least development environment plugins. As an example, the presentation module 118 can present the selected template to the user 109 on the client device 101, such as in the GUI 140.

At 406, customization inputs associated with the template are received, from the application development user interface, the customization inputs providing parameters used in the code-generation plugins. For example, the user 109 can present inputs in the client application 114 that are to be used as parameters within the template, for customizing the template At 408, application code is automatically generated for the target computer based on the selected template and the received customization inputs, the generated application code including at least the code generated from the code-generation plugins. For example, the code generation module 122 can generate code, e.g., to be provided for storage as software components 115.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method comprising:
receiving, from an application development user interface including one or more code-generation plugins, a selection of a template from plural templates, the template including:
a declarative model file describing user interface aspects for declaring customization of applications in an implementation-independent, consistent way, independent of the selected template and a target computer for generated code;
a metadata file including information describing the template;
one or more template files providing specific syntax suitable for code generation; and
custom code hooks for user customization of the template, including containers for holding custom code provided by the user and triggers for executing the custom code when the application code is executed according to timing specified by the hooks;
providing the template in the application development user interface;
receiving, from the application development user interface, customization inputs associated with the template, the customization inputs providing parameters used in the code-generation plugins; and
automatically generating application code for the target computer based on the selected template and the received customization inputs, the generated application code including at least the code generated from the code-generation plugins.

2. The method of claim 1, wherein the template is consistent in use with other templates of the plural templates and provides a consistent coding experience for the user.

3. The method of claim 1, wherein the application development user interface further includes development environment plugins.

4. The method of claim 3, wherein providing the template in the application development user interface comprises providing the template in the application development user interface using at least the development environment plugins, wherein the development environment plugins include multiple plugins for multiple interactive development environments (IDEs).

5. The method of claim 1, wherein the metadata further includes a template identification (ID), a template name, a version, a description of what the template provides, and a category associated with the template.

6. The method of claim 1, wherein the declarative model file includes definitions for field types selected from a group comprising a text box, a combo box, a drop-down, a check box, and a radio button.

7. The method of claim 1, further comprising:
receiving, from a template development user interface, template information associated with the plural templates; and
storing the template information for use by the application development user interface.

8. The method of claim 1, wherein fields in the template are mandatory or required.

9. The method of claim 1, wherein fields in the template have default values.

10. A system comprising:
memory storing:
plural templates comprising information from which application code can be customized using parameter values provided by a software developer for a specific template;
software components comprising the application code generated using the templates;
plugins used for generating a user interface and for generating code based on the parameter values provided by the software developer; and
an application for:
receiving, from an application development user interface including one or more code-generation plugins, a selection of a template from plural templates, the template including:
a declarative model file describing user interface aspects for declaring customization of applications in an implementation-independent, consistent way, independent of the selected template and a target computer for generated code;
a metadata file including information describing the template;
one or more template files providing specific syntax suitable for code generation; and
custom code hooks for user customization of the template, including containers for holding custom code provided by the user and triggers for executing the custom code when the application code is executed according to timing specified by the hooks;
providing the template in the application development user interface;
receiving, from the application development user interface, customization inputs associated with the template, the customization inputs providing parameters used in the code-generation plugins; and
automatically generating application code for the target computer based on the selected template and the received customization inputs, the generated application code including at least the code generated from the code-generation plugins.

11. The system of claim 10, wherein the template is consistent in use with other templates of the plural templates and provides a consistent coding experience for the user.

12. The system of claim 10, wherein the application development user interface further includes development environment plugins.

13. The system of claim 12, wherein providing the template in the application development user interface comprises providing the template in the application development user interface using at least the development environment plugins, wherein the development environment plugins include multiple plugins for multiple interactive development environments (IDEs).

14. The system of claim 10, wherein the metadata further includes a template identification (ID), a template name, a version, a description of what the template provides, and a category associated with the template.

15. The system of claim 10, wherein the declarative model file includes definitions for field types selected from a group comprising a text box, a combo box, a drop-down, a check box, and a radio button.

16. A non-transitory computer-readable media encoded with a computer program, the program comprising instructions that when executed by one or more computers cause the one or more computers to perform operations comprising:

receiving, from an application development user interface including one or more code-generation plugins, a selection of a template from plural templates, the template including:

a declarative model file describing user interface aspects for declaring customization of applications in an implementation-independent, consistent way, independent of the selected template and a target computer for generated code;

a metadata file including information describing the template;

one or more template files providing specific syntax suitable for code generation; and custom code hooks for user customization of the template, including containers for holding custom code provided by the user and triggers for executing the custom code when the application code is executed according to timing specified by the hooks;

providing the template in the application development user interface;

receiving, from the application development user interface, customization inputs associated with the template, the customization inputs providing parameters used in the code-generation plugins; and automatically generating application code for the target computer based on the selected template and the received customization inputs, the generated application code including at least the code generated from the code-generation plugins.

17. The non-transitory computer-readable media of claim 16, wherein the template is consistent in use with other templates of the plural templates and provides a consistent coding experience for the user.

18. The non-transitory computer-readable media of claim 16, wherein the application development user interface further includes development environment plugins.

19. The non-transitory computer-readable media of claim 18, wherein providing the template in the application development user interface comprises providing the template in the application development user interface using at least the development environment plugins, wherein the development environment plugins include multiple plugins for multiple interactive development environments (IDEs).

20. The non-transitory computer-readable media of claim 16, wherein the metadata further includes a template RIM identification (ID), a template name, a version, a description of what the template provides, and a category associated with the template.

\* \* \* \* \*